United States Patent [19]

Riker

[11] Patent Number: 4,543,180

[45] Date of Patent: Sep. 24, 1985

[54] DEVICE FOR SEPARATING COARSE AND FINE PARTICLES FROM ULTRAFINES

[75] Inventor: Rudolf Riker, Memmingen, Fed. Rep. of Germany

[73] Assignee: Stetter GmbH, Memmingen, Fed. Rep. of Germany

[21] Appl. No.: 613,819

[22] Filed: May 25, 1984

[51] Int. Cl.⁴ ............................ B03B 7/00; B03B 5/56
[52] U.S. Cl. ...................................... 209/44; 209/11; 209/238; 209/255; 209/452; 209/155; 209/495; 366/228
[58] Field of Search ............... 209/155, 156, 669, 452, 209/451, 44, 172.5, 173, 238, 255, 495, 11; 134/25.1; 366/40, 57, 59, 227, 228

[56] References Cited

U.S. PATENT DOCUMENTS

| | | | |
|---|---|---|---|
| 1,064,459 | 6/1913 | DuPont | 209/452 X |
| 1,098,497 | 6/1914 | Hardinge | 209/451 |
| 1,140,962 | 5/1915 | Davison | 209/452 |
| 1,559,938 | 11/1925 | Chance | 209/452 X |
| 1,917,300 | 7/1929 | Hardinge | 209/452 |
| 2,047,202 | 7/1936 | Hardinge et al. | 209/452 |
| 2,624,461 | 1/1953 | Falconer | 209/452 X |
| 2,698,089 | 12/1954 | Sleeman | 209/172.5 |

Primary Examiner—Frank W. Lutter
Assistant Examiner—Thomas M. Lithgow
Attorney, Agent, or Firm—Kuhn Muller and Bazerman

[57] ABSTRACT

A device for separating fine articles as sand from a sludge containing ultrafine articles comprises a continuously rotated substantially horizontal drum having a helical web at the peripheral inside thereof. The mass flow to be separated is deposited in the drum at a place spaced from both ends of the drum. The drum moves the sand at the bottom of the drum to the discharge end thereof, where a water feeding system is arranged providing an oppositely directed fresh water flow which mixes with said ultrafine particles forming a sludge. The sand is elevated at the discharge end of the drum by a plurality of buckets and discharged via an inclined discharge chute through an outlet opening of the drum. The sludge is discharged through the opposite front wall opening through which the mass flow is fed within a feeding tube.

10 Claims, 9 Drawing Figures

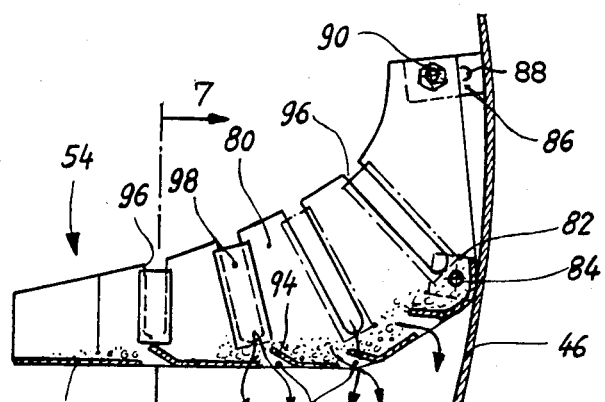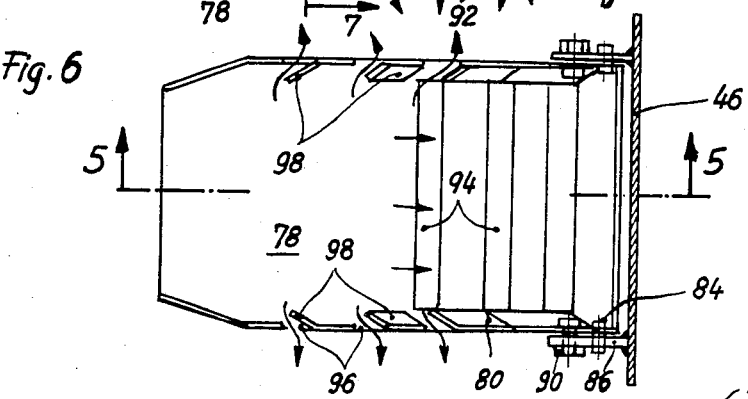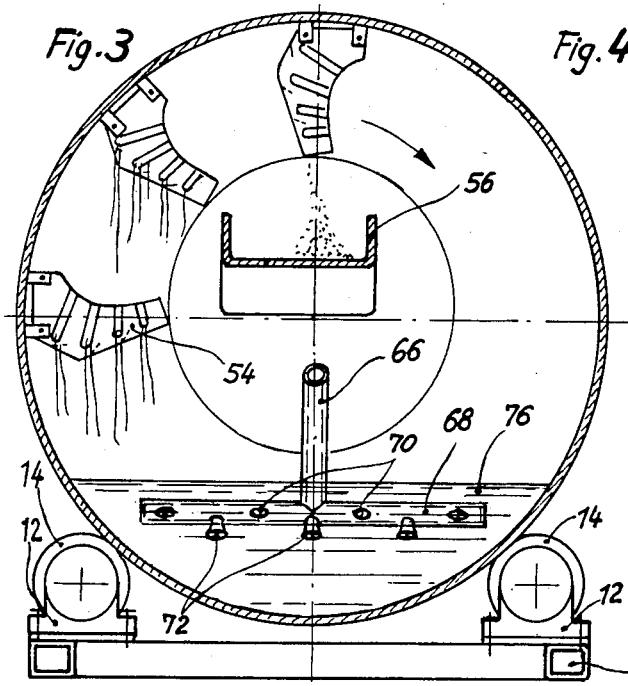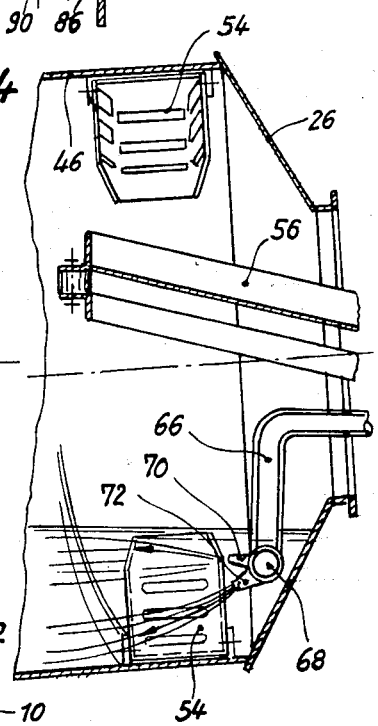

DEVICE FOR SEPARATING COARSE AND FINE PARTICLES FROM ULTRAFINES

BACKGROUND OF THE INVENTION

The invention relates to a device for separating a mass flow containing coarse and fine particles as gravel and sand and a sludge with ultrafine particles as laitance into its components.

A device for this purpose is known which comprises a trough and a screw conveyor therein. The axis of the conveyor is inclined under 30 degrees. In the lower part of the trough a water chamber is formed. The mass is fed into the water chamber and the sludge is discharged therefrom. The coarse and fine particles are transported upwards but only the coarse particles are discharged at the upward end of the trough, because the fine particles again and again are rinsed back. The known device is used for reprocessing leftover and returned concrete especially in the ready-mix concrete industry. In the concrete production coarse particles have granular sizes between 4 and 32 mm, fine particles between 0.2 and 4 mm and ultrafine particles between 0 and 0.2 mm. In the known device the so called screen cut lies in the range between 0.5 and 1.5 mm depending on the fed amount of mass per time unit. The known device is subjected to a remarkable wear because gravel is clamped between the rotating conveyor screw and the stationary trough. The device produces an excessive noise and requires a great driving energy because of the breaking of the clamped gravel.

SUMMARY OF THE INVENTION

Therefore it is one object of the invention to provide a novel concept for separating gravel and sand from a laitance containing ultrafine articles in order to reduce the screen cut.

Further it is one object to provide a separating device which is capable to gain a screen cut of granular size in the region of 0.2 mm.

Another object of the invention is to provide a separating device which works almost noiseless and requires a minimum of driving energy.

One further object is to provide a separating device for the separation of gravel and/or sand from a sludge containing only ultrafine particles with a low granular size up to about 0.2 mm, which has a long life due to absence of any remarkable wear.

A further object of the invention is to provide a separating device comprising a rotating drum having at least one spiral or helical web fastened at the inner circumference thereof, whereby no particles can be clamped between the conveyor web and the periperal wall of the drum.

A further object is to provide a separating device comprising a rotating drum the axis of which being horizontal or slightly inclined, the drum having opposed central front wall openings, a feeding pipe extending through an inlet opening thereof, immersing into a sludge water mixture and ending slightly above a helical web provided at the inside periphery of the drum at an axial distance from the inlet opening in the range of 15 to 40 percent of the overall length of the drum.

It is a further object of the invention to provide a rotating drum containing a sludge water mixture which moves uniformly in axial direction of the drum and leaves the drum through the front wall inlet opening thereof and to provide a plurality of screen-free buckets fastened at the inside of the peripheral wall of the drum adjacent the discharge end front wall outlet opening, draining means for said buckets and a discharge chute below the highest point of travel of the buckets, which chute downwardly inclined extending through the discharge opening of the drum outwards.

A further object is to provide a bucket arrangement at the discharge end of the drum, the buckets having draining openings of high efficiency however protected against blocking up.

Further object, features and advantages of the invention will become apparent from the following description of an example of the invention and the claims.

BRIEF DESCRIPTION OF THE DRAWINGS

FIG. 3 shows a cross-section of the separating device along line 3—3 of FIG. 1 in a greater scale;

FIG. 4 shows a longitudinal section of a drum of the separating device at the discharge end thereof;

FIG. 5 shows a longitudinal sectional view of a bucket provided at the peripheral wall of the drum along line 5—5 of FIG. 6;

FIG. 6 shows a plan view of the bucket of FIG. 5;

DESCRIPTION OF THE PREFERRED EMBODIMENT

Figure 1:
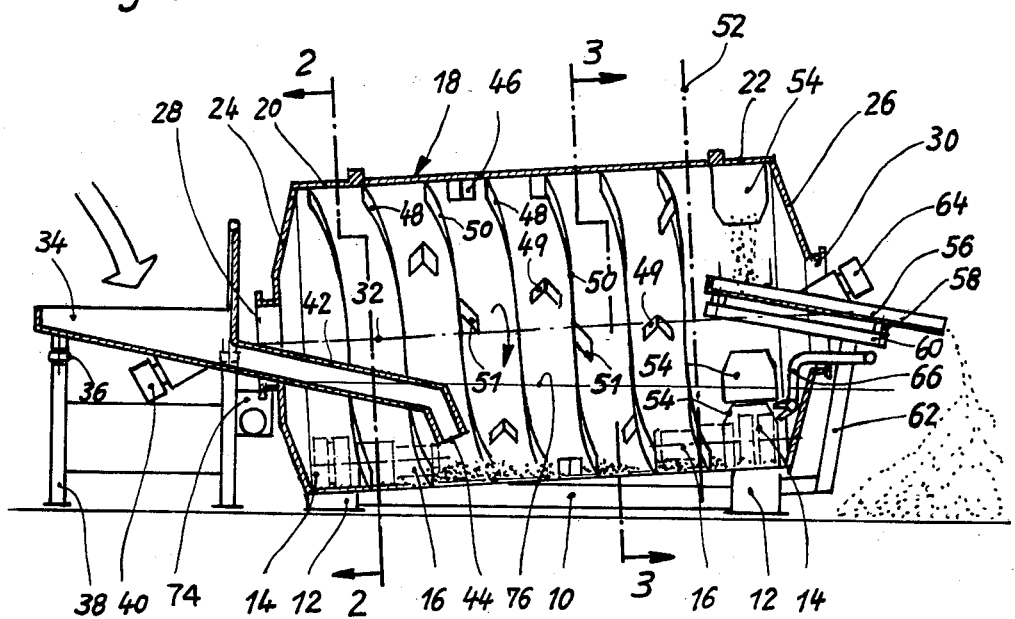
FIG. 1 shows a vertical longitudinal section of an embodiment of a separating device.
Figure 2:
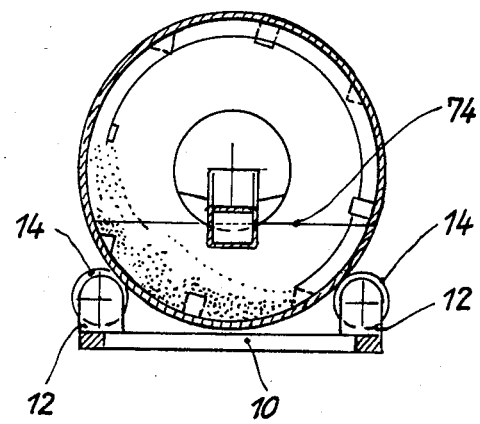
FIG. 2 shows a cross-section of the separating device along line 2—2 of FIG. 1.
Figure 7:
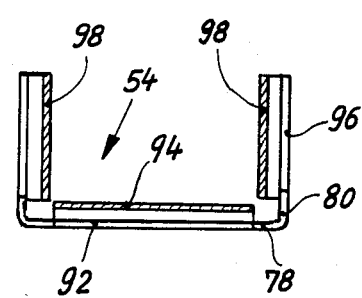
FIG. 7 shows a cross-section of the bucket along line 7—7 of FIG. 5.
Figure 8:
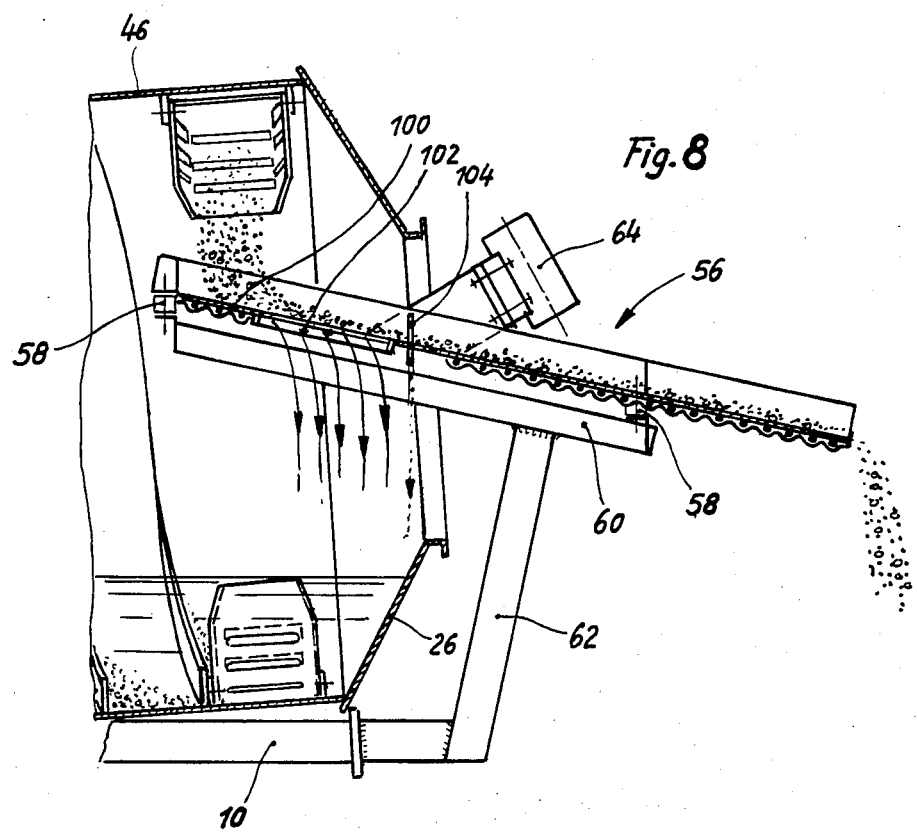
FIG. 8 shows a longitudinal section of the drum discharge end arrangement.
Figure 9:
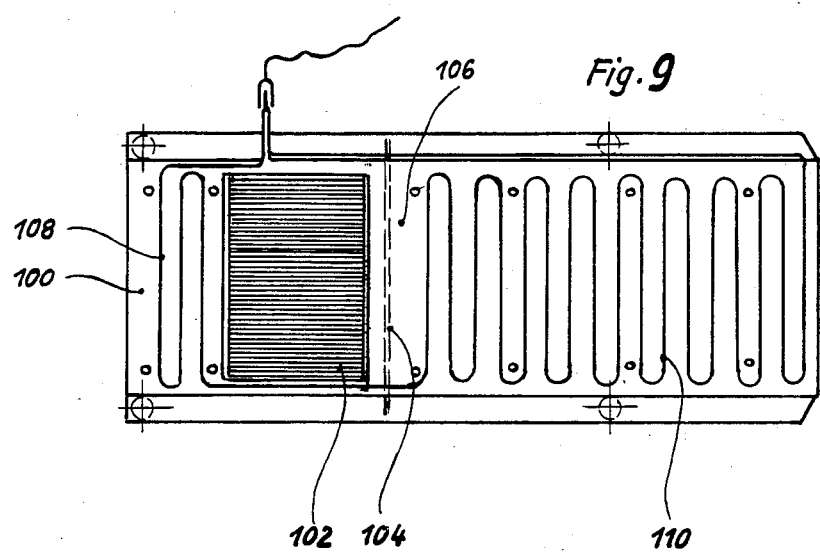
FIG. 9 shows a down side view of a discharge chute provided in the arrangement of FIG. 8.

At the four corners of a longitudinal rectangular bottom frame 10 upstanding brackets 12 are fastened at which supporting rollers are mounted for rotation. The two rollers 14 at one longitudinal half of the frame 10 are in driving connection with driving motors 16. A hollow cylindrical drum 18 is supported and mounted for rotation by the four rollers 14, whereby one pair of rollers co-operate with a guide ring 20 near one end of the drum 18 and the second pair of rollers 14 engage a similar guide ring 22 at the opposite end of the drum 18. The drum 18 is provided with frustoconical front walls 24, 26. A central circular inlet opening 28 is provided in the front wall 24 and a similar outlet opening 30 having a somewhat enlarged diameter with respect to that of the inlet opening 28 is provided in the front wall 26. The pair of rollers 14 at the end of the front wall 26 is on a level above that of the other pair of rollers so that the axis 32 of drum 18 is inclined. The angle of inclination of the axis 32 is in the range of 5 to 15 degrees and ascends from the inlet opening 28 to the outlet opening 30.

A feeding hopper 34 is mounted for vibration on swinging means 36 supported by vertical supports 38. A vibrator 40 is in engagement with the feeding hopper 34. A feeding tube 42 is associated with the feeding hopper 34 and extends with downward inclination through the inlet opening 28 into the interior of the drum 18.

The drum 18 has a diameter of about 2.3 meter and a length of 4 to 5 meters. It is important that the outlet end 44 of the feeding tube 42 has a substantial axial distance from the inlet opening 28. This distance is in the range of 15% to 40% of the overall length of the drum 18 and should be not less than 1.0 meter. In the prefered embodiment this distance is 1.5 meters.

At the inside surface of the peripheral cylindrical wall 46 of the drum 18 a pair of helical webs 48, 50 are fastened, forming a conveyor. The webs have a constant height of 5% at most of the drum diameter. In the embodiment shown in the drawings the height is 0.1 m. The outlet end 44 of the feeding tube 42 is radially spaced from the upper edges of the helical webs 48, 50 in the lower most position thereof by an amount in the range of 5% to 20% of the drum diameter. If the drum is rotated with a low circumferential velocity of 0.3 to 0.5 meters per second, i.e. 2.5 to 4 rpm, best conditions are achieved to separate ultrafine particles from the rest of the mass because in a water quantity as shall be described later the turbulence is on a low level.

Between the helical webs 48, 50 wedge-shaped projections 49 are fastened at the peripheral wall 46. The tips of wedge-shaped projections show in the rotation direction. These projections provide for cracking the deposited mass within the drum. Also projections 51 are fastened at the leading faces of the webs 48,50.

The helical webs 48, 50 begin near the front wall 24 and extend to a imaginary radial plane 52 spaced from the other front wall 26. At the peripheral wall portion between this radial plane 52 and the end of the cylindrical wall 46 of the drum 18 a plurality of buckets 54 are fastened leaving equal peripheral interspaces therebetween. An inclined discharge chute 56 mounted on a vibrator arrangement 58 extends from outside of the drum 18 through the outlet opening 30 of the front wall 26 into the interior of the drum 18 at least to the radial plane 52. The vibrator arrangement 58 is supported by a frame 60 mounted on struts 62 which are fastened at the bottom frame 10. The vibrator arrangement is driven by a motor 64.

A water feeding system comprises a feeding pipe 66 extending through the outlet opening 30 into the interior of the drum and below the outlet opening is connected with a transverse horizontal distributing tube 68, the closed ends of which only spaced by a small amount from the frusto-conical front wall 26 of the drum. The water feeding system as descried is arranged in the space surrounded by the frusto-conical front wall 26. An upper row of outlet nozzles 70 and a lower row of outlet openings 72 communicate with the interior of the distributing pipe 68. The nozzles 70 are offset in transverse direction with respect to the nozzles 72 and all the nozzles are mainly directed on to the inlet opening 28 of the drum. The axes of the upper nozzles 70 are directed slightly upwards and that of the lower nozzles 72 slightly downwards thus producing a uniform water flow with a low flow velocity in the drum 18.

The level 74 of the sludge water mixture is defined by the lower most point of the inlet opening 28 of the drum 18. Because of the slight inclination of the drum axis 32 the outlet opening 30 lies above said level 74. A receiver 76 is mounted at the struts 38 of the feeding hopper outside of the drum 18 below the inlet opening 28 thereof.

Each bucket 54 comprises a bottom wall 78 and a pair of side walls 80, thus forming a channel which extends substantially in a radial direction with respect to the peripheral wall 46 of the drum 18. The bucket 54 is pivotably mounted between a pair of brackets 82 fastened at the peripheral wall 46 of the drum. The pivot axis 84 is parallel with the drum axis 32, and arranged at the radially outward end of the bottom wall 78 adjacent the peripheral drum wall 46. The side walls 80 are of enlarging height in the radially outward direction and at the heighest point thereof are adjustably fastened at a second pair of brackets 86 fastened at the peripheral wall 46 and provided with slots 88 respectively which are passed by screw bolts 90 of the side walls 80. By this mounting the inclination of the buckets can be adjusted dependent on the properties of the gravel and sand in order to provide for a complete collection of the discharged mass on the discharge chute 56.

The bottom wall 78 of each bucket 54 has a plurality of draining slots the width of which is in the range of 10 to 30 mm and preferably 20 mm. The slots 92 extend axially substantially over the whole width of the bottom wall 78 and are overlapped by inclined guide plates 94 respectively ascending in the radial inward direction of the drum 18 with respect to the bottom wall 78 by an angle of 15° to 40°. Therefore the free end edge of the guide plate 94 is spaced from the bottom wall 78 and the water can be effectively drained off avoiding any possibility that the slots 92 can become clogged or blocked up. As can be best seen in FIG. 5 the bottom wall 78 is composed of at least two planar portions adjoining one another angularly.

Each side wall 80 is also provided with draining slots 96 which run from the upper edge of the side wall 80 downwards almost down to the bottom wall 78. The width of the slots 96 are substantially the same as that of the bottom wall slots 92. The side wall slots 96 are overlapped by guide plates 98 extending inwards into the bucket 54 under an angle of 15° to 40° with respect to the side wall 80. The upwardly extending free end edge of each guide plate 98 is equally spaced from the side wall 80.

Thanks to the guide plates 94, 98 the slots 92, 96 are bridged so that during elevation of the buckets 54 gravel and sand are effectively drained but can move over the bottom guide plates 94 and along the side wall guide plates 98 and therefore can completely discharged onto the discharge chute 56. Due to this screenfree construction any danger of clogging is avoided.

From the forgoing it should be clear, that the buckets 54 are arranged to be open in the direction of rotation of the drum 18.

The bottom of the discharge chute 56 is composed of an upper impermeable plate 100, which forms the collecting area for gravel and sand discharged from the buckets 54. The plate 100 is followed by a fine-meshed screen 102 of plastic material the slots of which have a width of about 0.3 mm as measured in the transverse direction of the chute 54. This screen 102 is arranged substantially in the space surrounded by the frusto-conical front wall 26. The screen 102 extends over the whole width of the chute 56. At a short distance behind the lower end of the screen 102 a deflecting web 104 forming a dropping means is fastened at the lower side of the bottom of the chute 56 and at the outside faces of the side walls of the chute. The bottom edge of the deflecting web 104 is arranged within the frusto-conical front wall 26 at or near the front end thereof. The screen 102 provides for a post draining of the discharged mass. The screen 102 is followed by an impermeable plate 106. Electrical heating elements 108 and 110 are fastened at the lower faces of the plates 100 and 106.

The drum 18 rotates substantially noiseless. The water filling of about 5 cubic meters flows slowly and continuously in the counter-current principle to the fine and coarse particles moved by the helical webs 48,50. Substantially no turbulences are created in the water filling due to the small peripheral velocity of the drum 18. The fresh water consumption can be held at a low level because the axial flow rate is in all areas substantially the same. The fine and coarse particles above a grain size of about 0.2 mm are separated from the sludge containing ultrafine particles with a grain size below 0.2 mm. The screen cut therefore is on the very low level of 0.2 mm. The sludge-water leaving the receiver 76 can be further treated without problems because no deposits can settle down. The gravel and sand is effectively drained and when leaving the discharge chute 56 the water part is below 10 percent.

I claim:

1. An improvement in a machine for separating coarse and fine particles as gravel and/or sand from a sludge containing ultrafine substances, as laitance, the machine comprising a rotatably mounted drum provided with a pair of axially opposite openings, one said opening forming a discharge opening for said coarse and fine particles and the other said opening forming a discharge opening for the sludge, means to flow said sludge towards said other opening, feeding means being provided for feeding a mass containing components to be separated, said feeding means extending through said other of said pair of openings into the drum, a water feeding pipe extending through said one of said pair of openings into the drum, a sludge water mixture within said drum, a helical web provided at the inside of a peripheral wall of the drum, and a plurality of buckets fastened at said peripheral wall between said one opening and the helical web, said helical web being constructed and arranged to move said coarse and fine particles towards said buckets each of the said buckets being provided with a bottom wall and a pair of side walls and draining means in said bottom wall, and a discharge chute extending through said other one of said pair of openings; the improvement comprising:

draining means provided in each one of said pair of side walls of each said bucket, the draining means of the bottom wall of the buckets comprising a plurality of longitudinal slots having a width in the range of 10 to 30 mm and extending substantially parallel with one another and with the drum axis; the slots running substantially over the whole axial width of the bottom wall, each slot being overlapped by a guide plate which in a horizontal position of the bottom wall of the bucket forms an inclined ramp the radial inward edge of which is spaced above the bottom wall, the draining means of each one of said pair of side walls comprising a plurality of slots extending downwardly with the bottom wall in a horizontal position and ending at a small distance above the bottom wall, said plurality of slots being overlapped by guide plates respectively at the inside of each side wall, the said side wall guide plates forming inclined ramps with respect to the side walls, and the radial inward edge of each side wall guide plate in a horizontal position of the bottom wall extending upwards and being spaced from the side wall.

2. An improvement as claimed in claim 1, wherein the bottom wall of the bucket is formed of a plurality of planar portions angularly adjoining one another in radial direction.

3. An improvement as claimed in claim 1, wherein each said bucket is pivotably mounted at the peripheral wall of the drum, the pivot axis arranged at the radial outward end of the bottom wall direct at the peripheral wall, the pivot axis being parallel with the drum axis and wherein adjustment means are provided at the side walls of the bucket and the peripheral wall of the drum at interspaces in peripheral direction from the pivot axis to fasten the bucket in one of a plurality of different inclinations to the peripheral wall.

4. An improvement as claimed in claim 1, wherein the angle of ramp inclination of each one of said guide plates is in the range of 15° to 40°.

5. An improvement as claimed in claim 1, wherein the height of the side walls reduces in radial inward direction from the peripheral wall of the drum to the radial inward end of the bucket.

6. An improvement as claimed in claim 1, wherein the bottom of the discharge chute comprises a water permeable screen part within the drum and an impermeable part outside of the drum, a deflecting web forming a dropping means being fastened at a lower side of the chute bottom between the permeable and impermeable parts of the bottom of the chute and extending in transverse direction over the whole width of the chute; and wherein the bottom edge of the deflecting web is arranged within the drum at the one of the said pair of openings.

7. An improvement as claimed in claim 1, wherein the discharge chute is connected with a vibrating device.

8. An improvement as claimed in claim 1, wherein said pair of opposite openings are formed in frusto-conical end walls, and wherein the water feeding pipe is connected with a horizontal transversally arranged distributing pipe, arranged between said plurality of buckets and the one opening, and extending below the sludge water mixture level in the drum, both ends of the distributing pipe leaving only small interspaces with the frusto-conical end wall; and wherein the distributing pipe is provided with a plurality of water outlet openings at least partly directed to the opposite end wall containing the other opening of the drum.

9. An improvement as claimed in claim 8, wherein at least an upper row and a lower row of outlet openings are provided in said distributing pipe, the outlet openings of one row being offset to the outlet openings of the other row respectively, thus providing a substantially uniform water flow in counter-direction to the conveyance of the helical web.

10. An improvement as claimed in claim 9, wherein the outlet openings are formed by nozzles, the nozzles of one row having a different inclination to that of the other row of nozzles.

* * * * *